United States Patent
Wee et al.

(10) Patent No.: US 11,281,930 B2
(45) Date of Patent: Mar. 22, 2022

(54) SYSTEM AND METHOD FOR OBJECT DETECTION

(71) Applicant: Fingram Co., Ltd., Yongin-si (KR)

(72) Inventors: Young Cheul Wee, Suwon-si (KR); Young Hoon Ahn, Suwon-si (KR); Yang Seong Jin, Suwon-si (KR)

(73) Assignee: Fingram Co., Ltd., Yongin-si (KR)

( * ) Notice: Subject to any disclaimer, the term of this patent is extended or adjusted under 35 U.S.C. 154(b) by 0 days.

(21) Appl. No.: 16/800,666

(22) Filed: Jun. 1, 2020

(65) Prior Publication Data
US 2020/0320332 A1  Oct. 8, 2020

(30) Foreign Application Priority Data
Feb. 26, 2019 (KR) .................. 10-2019-0022778

(51) Int. Cl.
*G06K 9/46* (2006.01)
*G06T 7/73* (2017.01)

(52) U.S. Cl.
CPC .............. *G06K 9/4638* (2013.01); *G06T 7/73* (2017.01)

(58) Field of Classification Search
CPC ..... G06T 7/12; G06T 7/11; G06T 7/13; G06T 7/73; G06T 7/181; G06T 7/136; G06K 2209/21; G06K 9/325; G06K 9/4604; G06K 9/4638; G06K 9/344; G06K 9/3233; G06K 2209/01

See application file for complete search history.

(56) References Cited

U.S. PATENT DOCUMENTS

| 5,572,602 A * | 11/1996 | Naoi ...................... G06K 9/346 382/178 |
| 6,434,270 B1 * | 8/2002 | Ohara .................... G06K 9/346 382/178 |
| 8,942,420 B2 | 1/2015 | Kim et al. |
| 10,887,487 B2 * | 1/2021 | Segarra, Jr ............... G06K 9/72 |
| 2008/0170784 A1 * | 7/2008 | Guerzhoy ............... G06T 7/143 382/173 |

(Continued)

FOREIGN PATENT DOCUMENTS

| KR | 10-2015-0059793 | 6/2015 |
| KR | 101782633 B1 * | 9/2017 .......... G06K 9/3208 |

OTHER PUBLICATIONS

Geometric Framework for Rectangular Shape Detection (Year: 2014).*

*Primary Examiner* — Nizar N Sivji
(74) *Attorney, Agent, or Firm* — H.C. Park & Associates, PLC (57) ABSTRACT

Disclosed is an object detection method and a system thereof. The object detection method for detecting an object, the method comprising the steps of: extracting line segments from an image in which a detection target is displayed, by an object detection system, generating merged line segments on the basis of directionality of each of the extracted line segments, by the object detection system, specifying candidate outer lines corresponding to outer lines of the object on the basis of a line segment set including the generated merged line segments, by the object detection system; and specifying the candidate outer lines as the outer lines of the object on the basis of whether or not the specified candidate outer lines correspond to appearance attributes of the object, by the object detection system.

13 Claims, 7 Drawing Sheets

(56) References Cited

U.S. PATENT DOCUMENTS

| | | | |
|---|---|---|---|
| 2008/0199082 A1* | 8/2008 | Tanaka | G06K 9/4604 |
| | | | 382/199 |
| 2015/0379338 A1* | 12/2015 | Lee | G06K 9/3275 |
| | | | 194/302 |
| 2017/0046580 A1* | 2/2017 | Lu | G06T 7/70 |
| 2019/0295267 A1* | 9/2019 | Cheng | G06K 9/38 |
| 2019/0332873 A1* | 10/2019 | Fattal | G06K 9/4652 |
| 2020/0320331 A1* | 10/2020 | Wee | G06K 9/325 |
| 2020/0320332 A1* | 10/2020 | Wee | G06K 9/4638 |

\* cited by examiner

SYSTEM AND METHOD FOR OBJECT DETECTION

TECHNICAL FIELD

The present invention relates to an object detection system and a method thereof, and more specifically, to a system and a method capable of detecting a position (an outer line) of an object having a specific shape more effectively.

BACKGROUND ART

There is a growing need for detection of objects existing in various fields.

Object detection determines whether an object to be detected exists in an image through object detection and is also required even in a service for recognizing meaningful information displayed on a detected object.

For example, in order to rapidly and accurately recognize information to be recognized from a captured image in a service of recognizing a card number displayed on a financial card (e.g., a credit card or a check card, etc.) or a license plate of a vehicle, it may be effective to detect first where a corresponding object is located in the image.

That is, compared to optical character recognition (OCR) performed on an image itself to recognize meaningful information displayed on the image, if OCR is performed in a predetermined method after the position of a target object is accurately identified, information may be recognized more accurately.

Accordingly, it is required to provide a method capable of detecting a position of an object (an outer line of the object) more effectively.

DOCUMENT OF PRIOR ART (Patent Document 1) Korean Laid-open Patent No. 10-2015-007011377 "Detection of characters embossed on a card"

DISCLOSURE OF INVENTION

Technical Problem to be Solved

Therefore, the present invention has been made in view of the above problems, and it is an object of the present invention to provide a method capable of accurately detecting an object at a relatively high speed, and a system thereof.

Technical Solution

To accomplish the above object, according to one aspect of the present invention, there is provided an object detection method for detecting an object, the method comprising the steps of: extracting line segments from an image in which a detection target is displayed, by an object detection system, generating merged line segments on the basis of directionality of each of the extracted line segments, by the object detection system, specifying candidate outer lines corresponding to outer lines of the object on the basis of a line segment set including the generated merged line segments, by the object detection system; and specifying the candidate outer lines as the outer lines of the object on the basis of whether or not the specified candidate outer lines correspond to appearance attributes of the object, by the object detection system.

The step of generating merged line segments on the basis of directionality of each of the extracted line segments, by the object detection system, may include the step of generating a merged line segment for each region of interest on the basis of line segments extracted from each of a plurality of regions of interest set to correspond to each of the outer lines of the object.

The step of generating a merged line segment for each region of interest on the basis of line segments extracted from each of the regions of interest may included the step of generating the merged line segment by merging line segments having a directionality satisfying a reference condition, among line segments remaining after excluding line segments having a predetermined angle or higher with respect to a direction of a first outer line corresponding to a first region of interest among a plurality of first line segments extracted from the first region of interest of any one among the regions of interest.

The step of generating the merged line segment by merging line segments satisfying a reference condition may include the step of setting a reference line segment of any one among the remaining line segments, and determining, when each of orthogonal distances between an extension line of the reference line segment and both end points of the other line segment is smaller than or equal to a predetermined threshold value, that the other line segment satisfies the reference condition.

The step of generating the merged line segment by merging line segments satisfying a reference condition may include the step of setting a sum of a length of the reference line segment and a length of a projection line projecting the other line segment satisfying the reference condition to the extension line as a length of the merged line segment.

The step of specifying candidate outer lines corresponding to outer lines of the object on the basis of a line segment set including the generated merged line segments, by the object detection system, may included the step of extracting any one line segment from each of line segment sets corresponding to the regions of interest, and specifying outer lines of a candidate figure formed by straight lines extending the extracted line segments as the candidate outer lines.

The step of specifying candidate outer lines corresponding to outer lines of the object on the basis of a line segment set including the generated merged line segments, by the object detection system, may include the step of extracting line segments in order of decreasing length from each of line segment sets corresponding to the regions of interest.

The step of specifying the candidate outer lines as the outer lines of the object on the basis of whether or not specific candidate outer lines correspond to appearance attributes of the object, by the object detection system, may include the step of specifying, when the object has a shape of a specific figure, the candidate outer lines as the outer lines of the object if a value of length ratio specified on the basis of a length of each of outer lines of a candidate figure formed by the candidate outer lines corresponds to a value of length ratio of the specific figure within a predetermined threshold value.

The step of specifying the candidate outer lines as the outer lines of the object on the basis of whether or not specific candidate outer lines correspond to appearance attributes of the object, by the object detection system, may include the step of correcting a length of at least one of the outer lines on the basis of a difference between an internal angle that a vertex of the specific figure should have and an actual internal angle of the candidate figure, and calculating the value of length ratio on the basis of the corrected length.

The object detection method may be implemented by a computer program installed in a data processing device To accomplish the above object, according to another aspect of the present invention, there is provide an object detection system for detecting an object, the method comprising: an extraction module for extracting line segments from an image in which a detection target is displayed, a merge module for generating merged line segments on the basis of directionality of each of the extracted line segments; and a control module for specifying candidate outer lines corresponding to outer lines of the object on the basis of a line segment set including the generated merged line segments, and specifying the candidate outer lines as the outer lines of the object on the basis of whether or not specific candidate outer lines correspond to attributes corresponding to a shape of the object.

The extraction module extracts line segments from each of a plurality of regions of interest set to correspond to each of the outer lines of the object, and the merge module generates a merged line segment for each region of interest on the basis of line segments extracted from each of the regions of interest.

The merge module generates the merged line segment by merging line segments having a directionality satisfying a reference condition, among line segments remaining after excluding line segments having a predetermined angle or higher with respect to a direction of a first outer line corresponding to a first region of interest among a plurality of first line segments extracted from the first region of interest among the regions of interest.

The control module extracts any one line segment from each of line segment sets corresponding to the regions of interest, and specifies outer lines of a candidate figure formed by straight lines extending the extracted line segments as the candidate outer lines.

The control module specifies, when the object has a shape of a specific figure, the candidate outer lines as the outer lines of the object if a value of length ratio specified on the basis of a length of each of outer lines of a candidate figure formed by the candidate outer lines corresponds to a value of length ratio of the specific figure within a predetermined threshold value.

Advantageous Effects

According to the spirit of the present invention, there is an effect of detecting an object relatively accurately although the outer line of the object to be detected is detected broken and extracted not being clearly.

BRIEF DESCRIPTION OF THE DRAWINGS

To more sufficiently understand the drawings cited in the detailed description of the present invention, a brief description of each drawing is provided.

BEST MODE FOR CARRYING OUT THE INVENTION

Since the present invention may be diversely converted and have various embodiments, specific embodiments will be shown in the drawings and described in detail in the detailed description. However, it should be understood that this is not intended to limit the present invention to the specific embodiments, but to comprise all conversions, equivalents and substitutions included in the spirit and scope of the present invention. In describing the present invention, if it is determined that the detailed description on the related known art may obscure the gist of the present invention, the detailed description will be omitted.

The terms such as "first" and "second" can be used in describing various constitutional components, but the above constitutional components should not be restricted by the above terms. The above terms are used only to distinguish one constitutional component from the other.

The terms used herein are used only to describe particular embodiments and are not intended to limit the present invention. A singular expression includes a plurality of expressions, unless the context clearly indicates otherwise.

In this specification, it should be further understood that the terms "include" and "have" specify the presence of stated features, numerals, steps, operations, constitutional components, parts, or a combination thereof, but do not preclude the presence or addition of one or more other features, numerals, steps, operations, constitutional components, parts, or a combination thereof.

In addition, in this specification, when any one of constitutional components "transmits" a data to another constitutional component, it means that the constitutional component may directly transmits the data to another constitutional component or may transmit the data to another constitutional component through at least one of the other constitutional components. On the contrary, when any one of the constitutional components directly transmits a data to another constitutional component, it means that the data is transmitted to another constitutional component without passing through the other constitutional components.

Hereinafter, the present invention is described in detail focusing on the embodiments of the present invention with reference to the attached drawings. Like reference symbols presented in each drawing denote like members.

Figure 1:
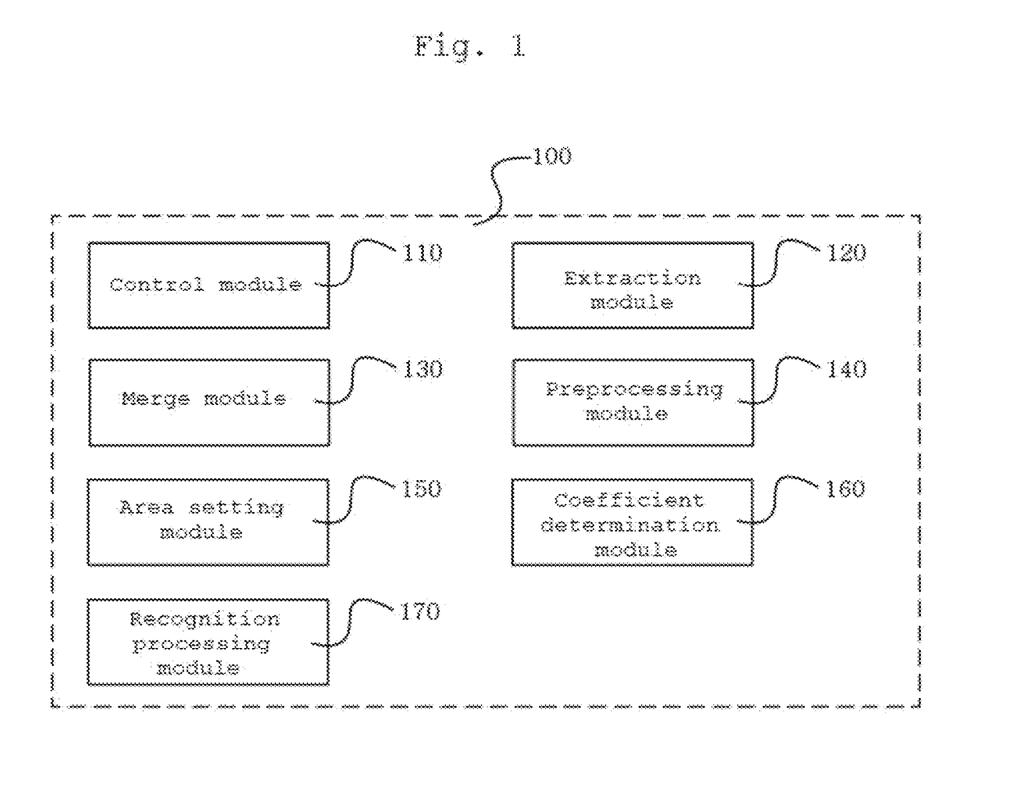
FIG. 1 is a view schematically showing the logical configuration of an object detection system according to the spirit of the present invention.

FIG. 1 is a view schematically showing the logical configuration of an object recognition system according to the spirit of the present invention.

Referring to FIG. 1, an object detection system 100 may be implemented to implement an object detection method according to the spirit of the present invention.

The detection system 100 (hereinafter, referred to as a detection system) may be installed in a predetermined data processing system (not shown) to implement the spirit of the present invention.

The data processing system means a system having a computing capability for implementing the spirit of the present invention, and average experts in the technical field of the present invention may easily infer that any system capable of performing a service using object detection according to the spirit of the present invention, such as a personal computer, a portable terminal, or the like, as well as a network server generally accessible by a client through a network, may be defined as the data processing system defined in this specification.

Hereinafter, although a case in which the object to be detected is a financial card (e.g., a credit card, a check card, etc.) is described as an example in the present specification, average experts in the technical field of the present invention may easily infer that the technical spirit of the present invention may be applied to any object having a predetermined shape (e.g., a rectangle or the like).

The data processing system may include a processor and a storage device. The processor may mean a computing device capable of driving a program for implementing the spirit of the present invention, and the processor may perform a function defined in this specification by driving the program.

The storage device may means a data storage means capable of storing the program, and may be implemented as a plurality of storage means according to embodiments. In addition, the storage device may mean not only a main memory device included in the data processing system, but also a temporary storage device or a memory that can be included in the processor.

Although it is shown in FIG. 1 that the detection system 100 is implemented as any one physical device, average experts in the technical field of the present invention may easily infer that a plurality of physical devices may be systematically combined as needed to implement the detection system 100 according to the spirit of the present invention.

According to the spirit of the present invention, the detection system 100 may detect a corresponding object from an image in which an object is displayed according to the spirit of the present invention. Detecting an object may mean detecting a position of the object from the image, and in this specification, it may mean extracting outer lines configuring the object.

The detection system 100 implemented for this function may have a configuration as shown in FIG. 1.

The detection system 100 may include a control module 110, an extraction module 120, and a merge module 130. The detection system 100 may further include a preprocessing module 140.

The detection system 100 may means a logical configuration having hardware resources and/or software needed for implementing the spirit of the present invention, and does not necessarily means a physical component or a device. That is, the detection system 100 may mean a logical combination of hardware and/or software provided to implement the spirit of the present invention, and if necessary, the detection system 100 may be installed in devices spaced apart from each other and perform respective functions to be implemented as a set of logical configurations for implementing the spirit of the present invention. In addition, the detection system 100 may mean a set of components separately implemented as each function or role for implementing the spirit of the present invention. For example, each of the control module 110, the extraction module 120, the merge module 130, and/or the preprocessing module 140 may be located in different physical devices or in the same physical device. In addition, according to embodiments, combinations of software and/or hardware configuring each of the control module 110, the extraction module 120, the merge module 130, and/or the preprocessing module 140, may also be located in different physical devices, and components located in different physical devices may be systematically combined with each other to implement each of the above modules.

In addition, a module in this specification may mean a functional and structural combination of hardware for performing the spirit of the present invention and software for driving the hardware. For example, average experts in the technical field of the present invention may easily infer that the module may mean a logical unit of a predetermined code and hardware resources for performing the predetermined code, and does not necessarily mean a physically connected code or a kind of hardware.

The control module 110 may control the components (e.g., the extraction module 120, the merge module 130, and/or the preprocessing module 140) included in the detection system 100 or manage their functions and/or resources to implement the spirit of the present invention.

The detection system 100 may know in advance a shape of an object to be detected. In addition, the detection system 100 may detect an object of the shape.

Hereinafter, although a case in which the object is a financial card is described as an example in this specification, average experts in the technical field of the present invention may easily infer that the spirit of the present invention may be used to detect various objects having a predetermined shape.

The extraction module 120 may extract line segments from an image. The shape of the object is set in the extraction module 120 in advance, and since the object may be a rectangle according to embodiments, the boundary of the object may be a straight line. Therefore, the extraction module 120 may extract line segments that may be all or part of the outer line, which are straight lines forming the boundary of the object, from the image.

The method of extracting the line segments from the image may vary. For example, edges displayed in the image may be detected through edge detection, and line segments may be extracted by extracting non-curved lines among the detected edges. Some of the extracted line segments may be all or part of the outer line, and the line segments extracted according to the image features displayed in the object, not the outer line, or the line segments extracted by the image features existing outside the object may be included in the extracted line segments.

In addition, predetermined preprocessing may be performed on the image photographed by an image capturing apparatus to extract these line segments more effectively.

For example, the preprocessing module 140 may separate channels for each channel of color (e.g., R, G, B or y, cb, cr, etc.) in the original image photographed by the image capturing apparatus. In addition, according to embodiments, the preprocessing module 140 may further perform predetermined filter processing. Then, the extraction module 120 may extract line segments from any one or a plurality of preprocessed images.

On the other hand, since the object has a predetermined shape and the position of each of the outer lines may be limited according to the shape, the extraction module 120 may extract line segments from each area, in which the outer lines are likely to be located, for more effective and faster detection of the object. The region that is set like this will be defined as a region of interest in this specification.

For example, when the object is a rectangular financial card, the outer line of the financial card may have an upper side, a lower side, a left side, and a right side. A corresponding region of interest may be assigned to each of the outer lines.

When a region of interest is assigned like this and the line segments are extracted from each region of interest or the line segments are merged in each region of interest as described below, the object may be detected within a shorter time. This is since that the direction of the outer line may be specified in advance for each region of interest.

Figure 3:
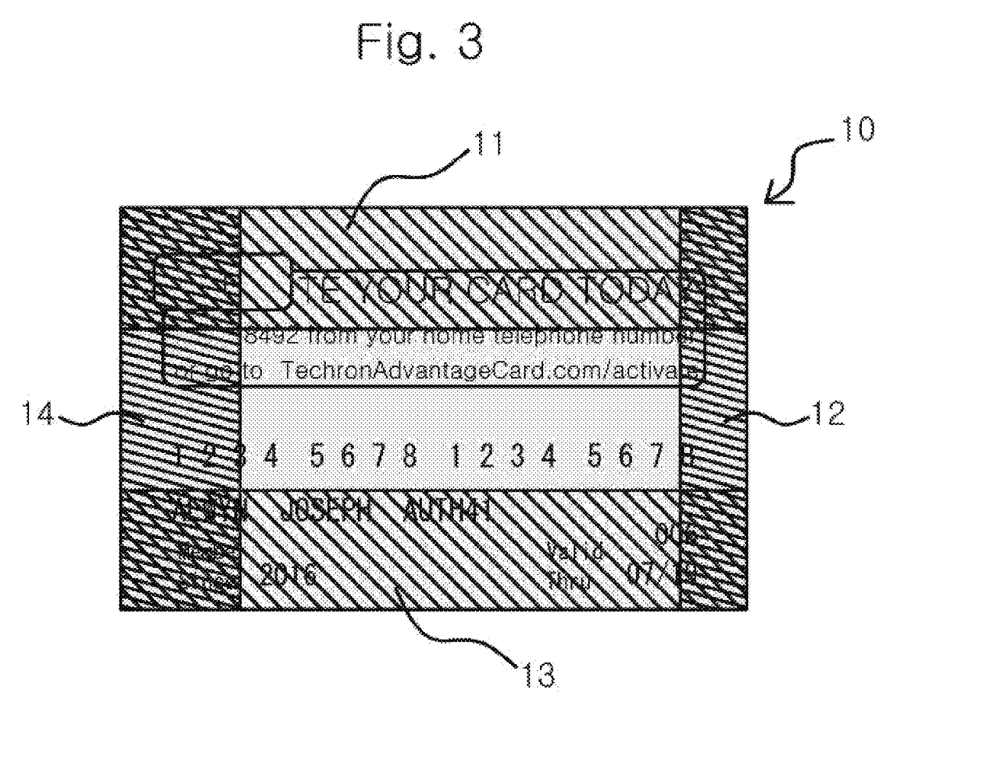
FIG. 3 is a view showing a region of interest in an object detection method according to an embodiment of the present invention.

FIG. 3 is a view showing a region of interest in an object detection method according to an embodiment of the present invention, and when the object is a financial card as shown in FIG. 3, four regions of interest 11, 12, 13 and 14 may be set from the image 10. Each of the regions of interest 11, 12, 13 and 14 may be a region in which each of the outer lines of the financial card may exist. Of course, the regions of interest 11, 12, 13 and 14 may be set as regions having a suitable size so that at least an outer line may be included.

According to an embodiment, the extraction module 120 may extract line segments only from the set regions of interest 11, 12, 13 and 14, or may extract line segments from the entire image and select only the segments included in the regions of interest 11, 12, 13 and 14. According to embodiments, the extraction module 120 may extract line segments from the entire image, and the merge module 130 may select only the line segments belonging to the regions of interest 11, 12, 13 and 14 among the extracted line segments and use the selected segments as a target of merge.

In any case, each of the line segments extracted from the image may be managed to confirm to which region of interest 11, 12, 13, and 14 the line segments belong.

Figure 4:
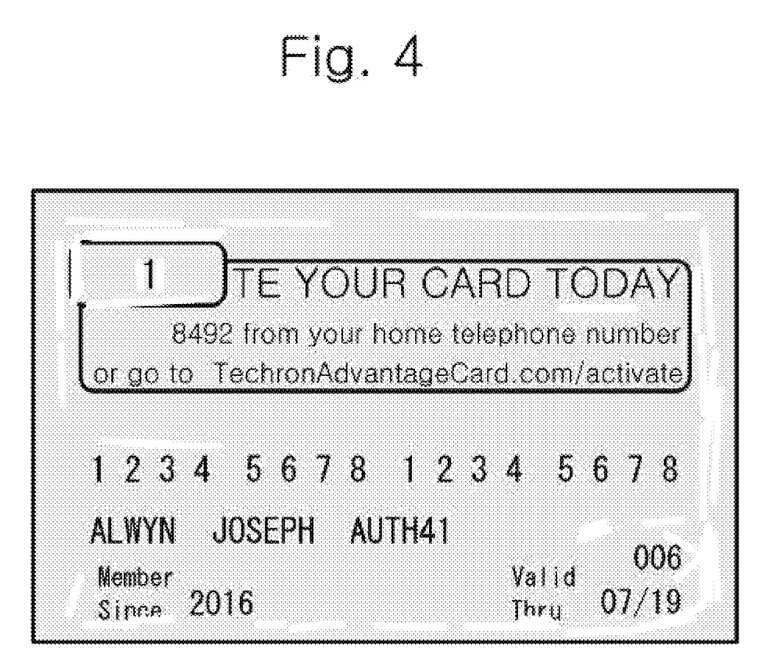
FIG. 4 is a view showing an example of extracting line segments according to an embodiment of the present invention.

For example, FIG. 4 is a view showing an example of extracting line segments according to an embodiment of the present invention. As shown in FIG. 4, the extraction module 120 may extract line segments separately for each of the regions of interest 11, 12, 13 and 14, and the extracted line segments may be as shown in FIG. 4

Then, the merge module 130 included in the detection system 100 may generate a merged line segment on the basis of the extracted line segments. The merge module 130 may generate merged line segments on the basis of the directionality of each of the extracted line segments.

In addition, the merge module 130 may generate a merged line segment for each region of interest. Generating a merged line segment for each region of interest means that a merged line segment corresponding to any one region of interest (e.g., a first region of interest 11) is generated by merging only the line segments extracted from the region of interest (e.g., the first region of interest 11).

The reason why the merge module 130 generates a merged line segment from the extracted line segments is that a case in which one outer line of an object is cut into a plurality of pieces and detected as a plurality of line segments is more frequent than a case in which the outer line of the object is wholly extracted as a single line segment according to the state or the photographing environment of an image. Accordingly, generating a merged line segment may be to find out which line segments among the line segments extracted or selected for each of the regions of interest 11, 12, 13 and 14 are the line segments corresponding to the outer line.

For example, as shown in FIG. 4, it is understood that all the upper side, the lower side, the left side, and the right side of the financial card are not detected as a line segment, but each one side is extracted as a plurality of broken line segments.

Meanwhile, since the directionality of an outer line corresponding to each of the regions of interest 11, 12, 13, and 14 is already determined before a merged line segment is generated, the merging module 130 may exclude line segments, having a big difference in the directionality with an outer line of a corresponding region of interest among the extracted line segments, from the target of merge. According to embodiments, the extraction module 120 may fundamentally delete the line segments having a big difference from the direction of the outer lines corresponding to the regions of interest 11, 12, 13 and 14 from the extracted line segments.

The merge module 130 and/or the extraction module 120 may exclude line segments having a predetermined or larger slope compare to direction of an outer line to i.e., directionality corresponding to each of the regions of interest 11, 12, 13 and 14, from the target of merge or fundamentally delete them from the extracted segments. For example, the outer lines corresponding to the first region of interest 11 and the third region of interest 13 may be the upper side and the lower side and have a direction close to the horizontal line although they are projected onto the camera plane. In this case, among the line segments extracted from the first region of interest 11 and the third region of interest 13, line segments inclined more than a predetermined angle (e.g., 30 degrees, 45 degrees, etc.) from the horizontal line may be excluded from the target of merge or fundamentally deleted from the list of extracted line segments.

In addition, the outer lines corresponding to the second region of interest 12 and the fourth region of interest 14 may be the right side and the left side of the financial card and have a direction close to the vertical line although they are projected onto the camera plane. In this case, among the line segments extracted from the second region of interest 12 and the fourth region of interest 14, the line segments inclined more than a predetermined angle (e.g., 30 degrees, 45 degrees, etc.) from the vertical line may be excluded from the target of merge or fundamentally deleted from the list of extracted line segments.

Then, the merge module 130 may generate a merged line segment for each of the regions of interest 11, 12, 13 and 14.

An example of generating the merged line segment by the merge module 130 will be described in detail with reference to FIG. 5.

Figure 5:
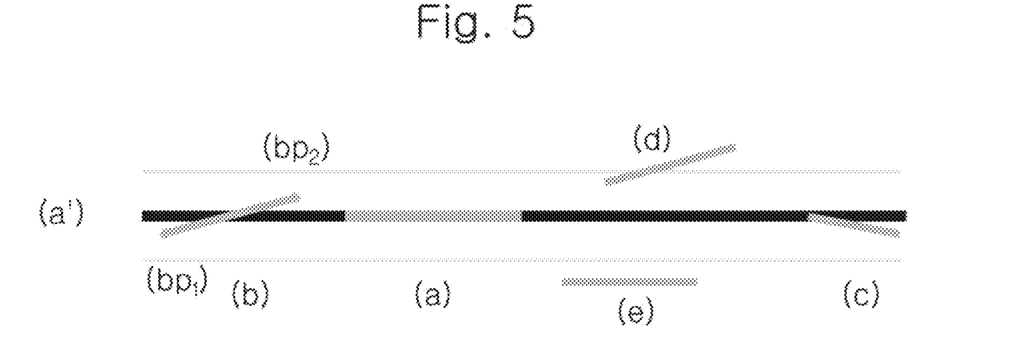
FIG. 5 is a view showing a merged line segment according to an embodiment of the present invention.

FIG. 5 is a view showing a merged line segment according to an embodiment of the present invention.

Referring to FIG. 5, the merging module 130 may merge line segments having a directionality satisfying a reference condition among the line segments remaining in each region of interest, i.e., the line segments remaining after excluding the line segments excluded from the target of merge since there is a big difference from the directionality of a corresponding region of interest.

The reference condition may be a directionality the same or similar as much as to satisfy a predetermined reference condition among the line segments remaining in each of the regions of interest 11, 12, 13 and 14.

For example, when the merge module 130 generates a merged line segment from the first region of interest 11, as shown in FIG. 5, it may select any one line segment (a), i.e., a reference line segment, among the line segments presently remaining in the first region of interest 11. For example, a line segment having a directionality most similar to the directionality (e.g., a horizontal line) of a corresponding region of interest 11, i.e., closest to the horizontal line, may be selected first as the reference line segment (a). Of course, according to embodiments, the merging process may be performed by sequentially setting reference line segments for all or some of the line segments.

Then, the merge module 130 may select other line segments of the first region of interest 11 which satisfy a predetermined condition in directionality with the reference line segment (a).

For example, in order to determine whether the directionality satisfies a predetermined condition, an angle formed by the reference line segment (a) or the extension line (a') of the reference line segment (a) and the other line segment may be used. In this case, a condition for crossing the extension line (a') of the reference line segment (a) and the other line segment should be added, or a condition related to distance may need to be additionally defined.

Alternatively, when the orthogonal distances between the extension line (a') of the reference line segment (a) and both end points (e.g., bp1 and bp2) of the other line segment (e.g., b) are smaller than or equal to a predetermined threshold value, respectively, it may be determined that the other line segment satisfies the predetermined condition.

In the embodiment of FIG. 5, line segment b and line segment c may be line segments satisfying the directionality condition with the reference line segment (a), and line segment d and line segment e may be line segments that do not satisfy the condition.

Then, reference line segment (a), line segment b, and line segment c may be line segments that can be merged.

The merged line segment may be the sum of the lengths of reference line segment (a) and each length of portion of reference line segment's (a) direction of other line segment b and c, and the direction of merged line segment may be same of the reference line segment (a).

That is, each length of portion of reference line segment's (a) direction of other line segment b and c may be the lengths of projected portion obtained by projecting each other line segments (e.g., b and c) to the extension line (a') of the reference line segment (a).

Then, the generated merged line has the direction of the reference line segment (a), and the length may be the sum of the length of the line segment (a), the projection length with respect to the extension line (a') of line segment b, and the projection length with respect to the extension line (a') of line segment c.

According to an embodiment, the merge module 130 may generate at least one merged line segment in the first region of interest 11 by changing the reference line segment while maintaining the merged line segment without deleting it from the line segment list of the first region of interest 11.

In this manner, the merge module 130 may generate at least one merged line segment for each of the regions of interest 11, 12, 13 and 14. Then, the segment sets in which the merged segments and the original segments are maintained for each of the regions of interest 11, 12, 13 and 14 may be maintained.

Thereafter, the control module 110 may extract the line segments that may be all or part of the actual outer line of the object one by one for each of the regions of interest 11, 12, 13 and 14. That is, the line segments may be extracted one by one from the segment set maintained for each of the regions of interest 11, 12, 13 and 14. The extracted line segment may be all or part of the outer line of each region of interest.

In this case, since the longest line segment among the set of segments is likely to be all or part of an actual outer line, it may be effective for the control module 110 to sequentially extract the line segments in order of length from the segment sets of each of the regions of interest 11, 12, 13 and 14.

In addition, since even the longest merged line segment may be shorter than the length of the outer line of the actual object, the control module 110 may specify the outer line of the shape formed by the extension lines of the line segments extracted from the regions of interest 11, 12, 13 and 14, i.e., the outer line of a candidate figure, as a candidate outer line. For example, the longest line segments are extracted one by one from each of the regions of interest 11, 12, 13 and 14, and a candidate outer line is specified on the basis of the extracted line segments, and if it is determined that the candidate outer line is not an outer line of the actual object, a process of sequentially extracting the next longest line segment and specifying a candidate outer line may be repeated while changing the region of interest. Of course, the order and/or the method of extracting a line segment to specify a candidate outer line for each of the regions of interest 11, 12, 13 and 14 may be diverse according to embodiments, and a line segment may be extracted from each of the regions of interest 11, 12, 13 and 14 in various ways, and an outer line of a figure formed by an extension line of the extracted line segment may be specified as a candidate outer line.

Figure 6:
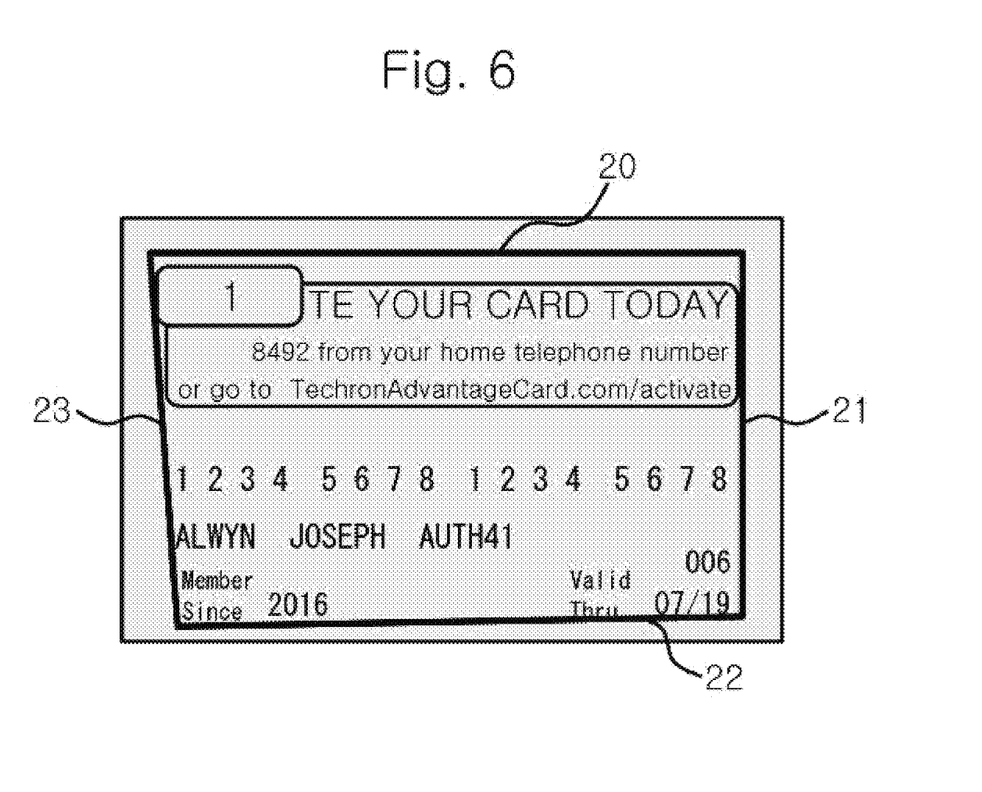
FIG. 6 is a view showing an example of a detected object according to an embodiment of the present invention.

An example of a specific candidate outer line may be as shown in FIG. 6.

FIG. 6 is a view showing an example of a detected object according to an embodiment of the present invention.

FIG. 6 shows a case in which a specific candidate outer line is an outer line of an actual object, and the specified candidate outer lines 20, 21, 22 and 23 may be extension lines of the line segments extracted from the regions of interest 11, 12, 13 and 14, respectively. In addition, a figure formed by the extension lines may be a candidate figure as shown in FIG. 6.

Then, the control module 110 may determine whether the appearance of the candidate figure corresponds to the appearance attribute of the object to be detected. That is, it may be determined whether specific candidate outer lines 20, 21, 22 and 23 correspond to the appearance attributes of the object.

For example, in the case of a financial card, the appearance attribute may be a predetermined aspect ratio (for example, 1.5858:1 in the case of ISO7810), and the control module 110 may determine whether a figure formed by the specific candidate outer lines conforms to the appearance attribute.

If it is determined that the candidate figure, i.e., the candidate outer lines, corresponds to the appearance attribute of the object, corresponding candidate outer lines may be determined as the outer lines of the actual object.

In this case, since the candidate outer lines are line segments extracted from the object in a state projected on the camera plane, although the candidate outer lines are the outer line of the actual object, the length of the outer line may be distorted. For example, although the object is a rectangle and the candidate outer lines are the outer lines of the actual object, the outer lines of the object in a state projected onto the camera plane may not be a rectangle.

Accordingly, it needs to adjust the distortion to more accurately determine whether a candidate figure or candidate outer lines correspond to the appearance attribute (e.g., a rectangle having a fixed aspect ratio) of the actual object.

That is, the control module 110 may use the length ratio of the candidate outer lines as the appearance attribute to determine whether the current candidate outer lines correspond to the appearance attribute of the object.

In this case, the length ratio of the candidate outer lines may be a ratio of length that the respective outer lines have with respect to all the candidate outer lines constituting the candidate figure, or a ratio of length that some (e.g., any one of the horizontal sides and any one of the vertical sides) of the candidate outer lines have. Alternatively, it may be a ratio that a value should have after a predetermined operation is performed on at least some of the candidate outer lines. In any case, the term "length ratio" herein is calculated on the basis of the length of a line segment (outer line) of a specific figure and may mean a unique value of the specific figure.

For example, as described above, when the object is a financial card, the financial card may have a ratio of 1.5858:1 as a ratio of a horizontal side to a vertical side. Accordingly, the length ratio of the candidate outer lines may also be defined as any value if the value may confirm whether the ratio of length between the candidate outer line and the horizontal outer line corresponds to the ratio of the horizontal side to the vertical side of the financial card.

For example, in this specification, it may be determined whether the sum of length of the horizontal outer lines and the sum of length of the vertical outer lines among the candidate outer lines corresponds to the length ratio of the financial card. The correspondence may be determined as a case in which the difference between the ratio of the sum of length of the horizontal outer lines to the sum of length of the vertical outer lines among the candidate outer lines and the length ratio of the financial card is equal to or smaller than a predetermined threshold value.

In this case, length ratio of the financial card may also be defined as the ratio of the sum of the horizontal outer lines to the sum of the vertical outer lines, and when the object is rectangular, the length ratio may be a value equal to the ratio of the length of any one of predetermined horizontal outer lines to the length of any one of predetermined vertical outer lines. However, since a predetermined distortion occurs while the candidate outer lines are projected on the camera plane as described above, the two horizontal outer lines (or vertical outer lines) may not have the same length, and thus it may be effective to use the ratio of the sum of length of the two horizontal outer lines (or vertical outer lines) as the length ratio.

In addition, since the calculation speed of accurate inverse projection is very slow, there is an effect of calculating in a short time in the case of calculating an approximate value using the sum of length of the horizontal outer lines and the vertical outer lines.

In order to compensate for the distortion of an object on the camera plane by using the approximation value, the angle of vertices (e.g., four corners) of the candidate figure may be used.

In the case where the original object is rectangular, it is normal when the internal angle of a vertex is 90 degrees, and the greater the difference from the 90 degrees, the greater the distortion of length of the outer lines connected to the vertex.

Accordingly, the control module 110 may correct the length of at least one of the outer lines on the basis of the difference between the internal angle (e.g., 90 degrees) that the vertex of a specific figure (e.g., rectangle) of the original object should have and the actual internal angle of the candidate figure, and calculate a value of the length ratio on the basis of the corrected length.

An example of this may be as follows.

For example, sum_w may be defined as a sum of two horizontal outer lines (e.g., 20 and 22) among the candidate outer lines.

In addition, sum_h may be defined as a sum of two vertical outer lines (e.g., 21 and 23) among the candidate outer lines.

In addition, aver_angle_error may be an average of the difference value between the angles of four vertices and a value (e.g., 90 degrees) that the internal angle of the vertex of the original object should have.

In addition, diff_w may be a difference value between two horizontal outer lines (e.g., 20 and 22) among the candidate outer lines, and diff_h may be a difference value between two vertical outer lines (e.g., 21 and 23) among the candidate outer lines.

Then, the length ratio corrected on the basis of the angles of four vertices may be defined as follows.

$$\text{card\_}wh\text{\_ratio} = \{\text{sum\_}w \times (1 - \sin(\text{aver\_angle\_error} \times \text{diff\_}w\text{\_ratio}))\} / \{\text{sum\_}h \times (1 - \sin(\text{aver\_angle\_error} \times \text{diff\_}h\text{\_ratio}))\} \quad [\text{Equation 1}]$$

Here, diff_w_ratio is diff_w/(diff_w+diff_h), diff_h_ratio may be defined as 1-diff_w_ratio.

When the corrected length ratio is within a predetermined threshold value from the length ratio 1.5858/1 of the financial card, it may be determined that the candidate outer lines correspond to the appearance attribute of the financial card.

Then, the candidate outer lines may be detected as the outer lines of the object. That is, a candidate figure may be detected as an object (or a position of the object).

When the candidate outer lines do not correspond to the appearance attribute of the object, the control module 110 may detect an object until the object is detected or by repeating a predetermined number of times while changing the candidate outer lines.

Figure 7:
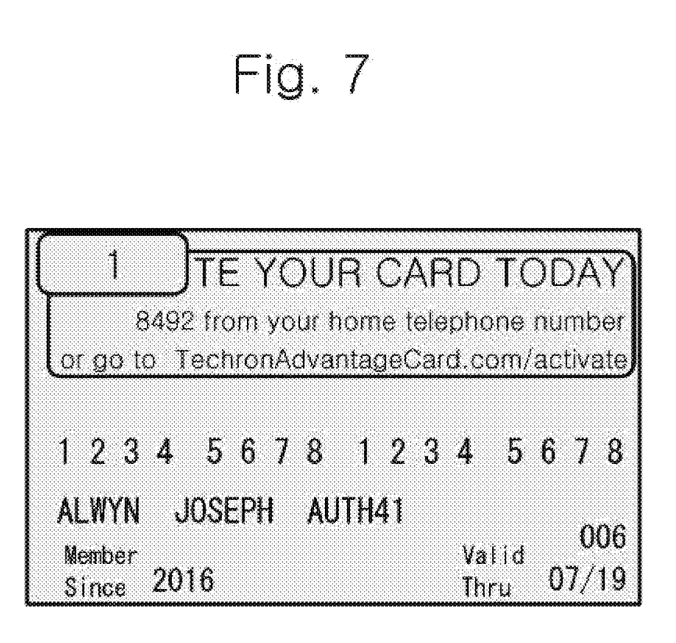
FIG. 7 is a view showing an example of warping a detected object according to an embodiment of the present invention.

When an object is detected, according to embodiments, the control module 110 may warp the distorted object to have an appearance attribute that the object should have originally. An example of the warping may be as shown in FIG. 7.

After warping is performed like this, an application service using the detected object can be more effectively performed.

For example, since the features of an object exist precisely at the normalized positions without distortion, faster and more accurate performance may be achieved in recognizing the features (e.g., a card number, an expiry date, etc.) displayed in the object.

The method of detecting an object according to the spirit of the present invention described above may be summarized overall as shown in FIG. 2.

Figure 2:
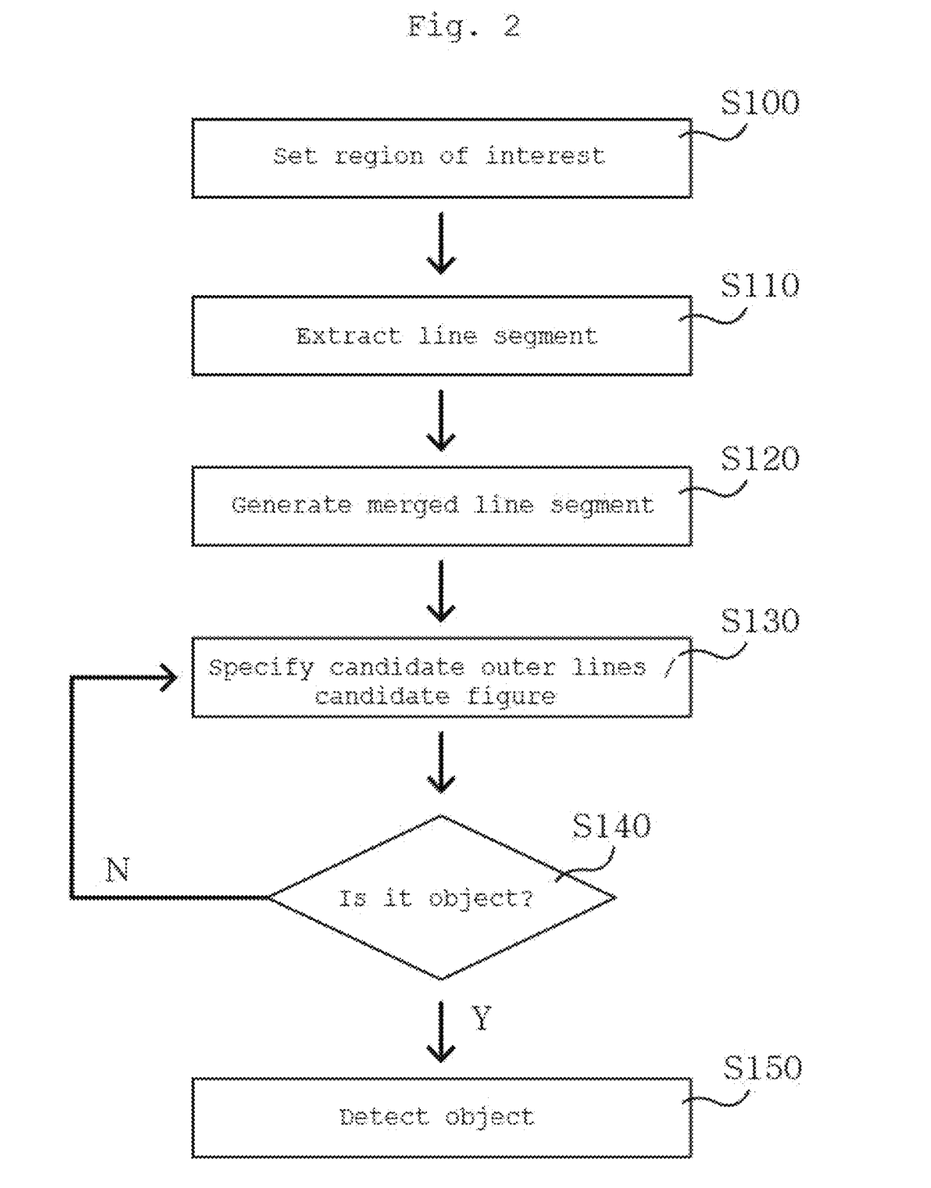
FIG. 2 is a flowchart schematically illustrating an object detection method according to an embodiment of the present invention.

FIG. 2 is a flowchart schematically illustrating an object detection method according to an embodiment of the present invention.

Referring to FIG. 2, the detection system 100 according to the spirit of the present invention may extract line segments from an image in which an object is displayed (S110). In this case, the detection system 100 may set regions of interest 11, 12, 13 and 14 of the image, and extract line segments for each of the set regions of interest 11, 12, 13 and 14 as described above (S100). Of course, according to embodiments, the line segment may be extracted from the whole image, and only the line segments belonging to the regions of interest 11, 12, 13 and 14 may be left among the extracted line segments.

Then, the detection system 100 may generate merged line segments for the regions of interest 11, 12, 13 and 14 (S120). Then, a segment set including the generated merged line segments may be maintained for each of the regions of interest 11, 12, 13 and 14.

Then, the detection system 100 may extract line segments from each of the regions of interest 11, 12, 13 and 14, and specify a candidate figure and/or candidate outer lines formed by the extension lines of the extracted line segments (S130).

Then, it may be determined whether the specific candidate figure and/or candidate outer lines are an object to be detected (S140). To this end, whether the candidate figure and/or the candidate outer lines corresponds to the appearance attribute of the object may be determined, and in this case, the length ratio of the candidate outer lines may be used. In addition, as described above, the length ratio may be compensated according to the distortion degree of the internal angle of the vertex.

In addition, if it is determined that the candidate outer lines are an object to be detected, the candidate outer lines are determined as the outer lines of the object, and the object detection process may be terminated (S150). If it is determined that the candidate outer lines are not an object to be detected, the process of re-setting the candidate outer lines and re-determining whether the re-set candidate outer lines are an object to be detected (S140) may be repeated.

The object detection method according to an embodiment of the present invention can be implemented as a computer-readable code in a computer-readable recording medium. The computer-readable recording medium includes all kinds of recording devices for storing data that can be read by a computer system. Examples of the computer-readable recording medium are ROM, RAM, CD-ROM, a magnetic tape, a hard disk, a floppy disk, an optical data storage device and the like. In addition, the computer-readable recording medium may be distributed in computer systems connected through a network, and a code that can be read by a computer in a distributed manner can be stored and executed therein. In addition, functional programs, codes and code segments for implementing the present invention can be easily inferred by programmers in the art.

While the present invention has been described with reference to the embodiments shown in the drawings, this is illustrative purposes only, and it will be understood by those having ordinary knowledge in the art that various modifications and other equivalent embodiments can be made. Accordingly, the true technical protection range of the present invention should be defined by the technical spirit of the attached claims.

The invention claimed is:

1. An object detection method for detecting an object, the method comprising the steps of:
   extracting line segments from an image in which a detection target is displayed, by an object detection system;
   generating merged line segments on the basis of directionality of each of the extracted line segments, by the object detection system;
   specifying candidate outer lines corresponding to outer lines of the object on the basis of a line segment set including the generated merged line segments, by the object detection system; and
   specifying the candidate outer lines as the outer lines of the object on the basis of whether or not the specified candidate outer lines correspond to appearance attributes of the object, by the object detection system,
   wherein the step of generating merged line segments on the basis of directionality of each of the extracted line segments, by the object detection system, includes the step of generating a merged line segment for each region of interest on the basis of line segments extracted from each of a plurality of regions of interest set to correspond to each of the outer lines of the object, and
   wherein the step of generating a merged line segment for each region of interest on the basis of line segments extracted from each of the plurality of regions of interest includes the step of generating the merged line segment by merging line segments having a directionality satisfying a reference condition, among line segments remaining after excluding line segments having a predetermined angle or higher with respect to a direction of a first outer line corresponding to a first region of interest among a plurality of first line segments extracted from the first region of interest among the plurality of regions of interest.

2. The method according to claim 1, wherein the step of generating the merged line segment by merging line segments satisfying a reference condition includes the step of setting a reference line segment among the remaining line segments, and determining, when each of orthogonal distances between an extension line of the reference line segment and both end points of the other line segment is smaller than or equal to a predetermined threshold value, that the other line segment satisfies the reference condition.

3. The method according to claim 1, wherein the step of generating the merged line segment by merging line segments satisfying a reference condition includes the step of setting a sum of a length of the reference line segment and a length of a projection line projecting the other line segment satisfying the reference condition to the extension line as a length of the merged line segment.

4. The method according to claim 1, wherein the step of specifying candidate outer lines corresponding to outer lines of the object on the basis of a line segment set including the generated merged line segments, by the object detection system, includes the step of extracting a line segment from each of line segment sets corresponding to the plurality of regions of interest, and specifying outer lines of a candidate figure formed by straight lines extending the extracted line segments as the candidate outer lines.

5. The method according to claim 4, wherein the step of specifying candidate outer lines corresponding to outer lines of the object on the basis of a line segment set including the generated merged line segments, by the object detection system, includes the step of extracting line segments in order of decreasing length from each of line segment sets corresponding to the plurality of regions of interest.

6. The method according to claim 1, wherein the step of specifying the candidate outer lines as the outer lines of the object on the basis of whether or not specific candidate outer lines correspond to appearance attributes of the object, by the object detection system, includes the step of specifying, when the object has a shape of a specific figure, the candidate outer lines as the outer lines of the object if a value of length ratio specified on the basis of a length of each of outer lines of a candidate figure formed by the candidate outer lines corresponds to a value of length ratio of the specific figure within a predetermined threshold value.

7. The method according to claim 6, wherein the step of specifying the candidate outer lines as the outer lines of the object on the basis of whether or not specific candidate outer lines correspond to appearance attributes of the object, by the object detection system, includes the step of correcting a length of at least one of the outer lines on the basis of a difference between an internal angle that a vertex of the specific figure should have and an actual internal angle of the candidate figure, and calculating the value of length ratio on the basis of the corrected length.

8. A non-transitory computer readable medium having stored thereon software instructions that, when executed by a processor, cause the processor to generate control signals to perform a method of claim 1.

9. An object detection system for detecting an object, the method comprising:
an extraction module for extracting line segments from an image in which a detection target is displayed;
a merge module for generating merged line segments on the basis of directionality of each of the extracted line segments; and
a control module for specifying candidate outer lines corresponding to outer lines of the object on the basis of a line segment set including the generated merged line segments, and specifying the candidate outer lines as the outer lines of the object on the basis of whether or not specific candidate outer lines correspond to attributes corresponding to a shape of the object,
wherein the extraction module extracts line segments from each of a plurality of regions of interest set to correspond to each of the outer lines of the object, and the merge module generates a merged line segment for each region of interest on the basis of line segments extracted from each of the plurality of regions of interest, and
wherein the control module specifies, when the object has a shape of a specific figure, the candidate outer lines as the outer lines of the object if a value of length ratio specified on the basis of a length of each of outer lines of a candidate figure formed by the candidate outer lines corresponds to a value of length ratio of the specific figure within a predetermined threshold value.

10. The system according to claim 9, wherein the merge module generates the merged line segment by merging line segments having a directionality satisfying a reference condition, among line segments remaining after excluding line segments having a predetermined angle or higher with respect to a direction of a first outer line corresponding to a first region of interest among a plurality of first line segments extracted from the first region of interest among the plurality of regions of interest.

11. The system according to claim 9, wherein the control module extracts a line segment from each of line segment sets corresponding to the plurality of regions of interest, and specifies outer lines of a candidate figure formed by straight lines extending the extracted line segments as the candidate outer lines.

12. An object detection method for detecting an object, the method comprising the steps of:
extracting line segments from an image in which a detection target is displayed, by an object detection system;
generating merged line segments on the basis of directionality of each of the extracted line segments, by the object detection system;
specifying candidate outer lines corresponding to outer lines of the object on the basis of a line segment set including the generated merged line segments, by the object detection system; and
specifying the candidate outer lines as the outer lines of the object on the basis of whether or not the specified candidate outer lines correspond to appearance attributes of the object, by the object detection system,
wherein the step of specifying the candidate outer lines as the outer lines of the object on the basis of whether or not specific candidate outer lines correspond to appearance attributes of the object, by the object detection system, includes the step of specifying, when the object has a shape of a specific figure, the candidate outer lines as the outer lines of the object if a value of length ratio specified on the basis of a length of each of outer lines of a candidate figure formed by the candidate outer lines corresponds to a value of length ratio of the specific figure within a predetermined threshold value.

13. The method according to claim 12, wherein the step of specifying the candidate outer lines as the outer lines of the object on the basis of whether or not specific candidate outer lines correspond to appearance attributes of the object, by the object detection system, includes the step of correcting a length of at least one of the outer lines on the basis of a difference between an internal angle that a vertex of the specific figure should have and an actual internal angle of the candidate figure, and calculating the value of length ratio on the basis of the corrected length.

* * * * *